United States Patent
Smith (10) Patent No.: US 7,844,539 B2
(45) Date of Patent: Nov. 30, 2010

(54) HYBRID TRADING SYSTEM FOR CONCURRENTLY TRADING COMBINED ORDERS FOR FINANCIAL INSTRUMENTS THROUGH BOTH ELECTRONIC AND OPEN-OUTCRY TRADING MECHANISMS

(75) Inventor: Eileen C. Smith, Chicago, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 449 days.

(21) Appl. No.: 12/040,365

(22) Filed: Feb. 29, 2008

(65) Prior Publication Data
US 2008/0243676 A1  Oct. 2, 2008

Related U.S. Application Data

(60) Provisional application No. 60/904,542, filed on Mar. 2, 2007.

(51) Int. Cl.
*G06Q 40/00* (2006.01)
(52) U.S. Cl. .......................... 705/37; 705/38
(58) Field of Classification Search .............. 705/37–38
See application file for complete search history.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,903,201 A | 2/1990 | Wagner |
| 4,980,826 A | 12/1990 | Wagner |
| 5,038,284 A | 8/1991 | Kramer |
| 5,101,353 A | 3/1992 | Lupien et al. |
| 5,136,501 A | 8/1992 | Silverman et al. |
| 5,297,031 A | 3/1994 | Gutterman et al. |

(Continued)

FOREIGN PATENT DOCUMENTS

EP    0 952 536 A1   10/1999

(Continued)

OTHER PUBLICATIONS

Evans et al. "The Effects of Electronic Trading System on Open-outcry Commodity Exchange", Social Science 410, Nov. 1998.

(Continued)

*Primary Examiner*—Thu Thao Havan
(74) *Attorney, Agent, or Firm*—Brinks Hofer Gilson & Lione (57) ABSTRACT

A system and method of trading combined orders in an exchange configured for trading by a combination of electronic and open-outcry trading mechanisms is provided. One method includes receiving an incoming order having a first order component and a second order component at an electronic trade engine and routing the first and second order components to a first electronic database. The first and second order components are matched and executed against order components maintained in the first and second electronic databases, respectively. Any unexecuted first and second order components are placed in an electronic book according to a predetermined program if the first or second order component cannot be completely matched against any order components maintained in one of the first or second electronic databases. The system includes a trade engine configured for receiving combined orders from market makers.

15 Claims, 3 Drawing Sheets

U.S. PATENT DOCUMENTS

| | | | |
|---|---|---|---|
| 5,297,032 | A | 3/1994 | Trojan et al. |
| 5,305,200 | A | 4/1994 | Hartheimer et al. |
| 5,315,634 | A | 5/1994 | Tanaka et al. |
| 5,664,115 | A | 9/1997 | Fraser |
| 5,689,652 | A | 11/1997 | Lupien et al. |
| 5,715,402 | A | 2/1998 | Popolo |
| 5,774,877 | A | 6/1998 | Patterson, Jr. et al. |
| 5,787,402 | A | 7/1998 | Potter et al. |
| 5,797,002 | A | 8/1998 | Patterson, Jr. et al. |
| 5,809,483 | A | 9/1998 | Broka et al. |
| 5,813,009 | A | 9/1998 | Johnson et al. |
| 5,905,974 | A | 5/1999 | Fraser et al. |
| 5,913,202 | A | 6/1999 | Motoyama |
| 5,924,082 | A | 7/1999 | Silverman et al. |
| 5,950,177 | A | 9/1999 | Lupien et al. |
| 5,963,923 | A | 10/1999 | Garber |
| 5,970,479 | A | 10/1999 | Spepherd |
| 5,978,779 | A | 11/1999 | Stein et al. |
| 6,014,627 | A | 1/2000 | Togher et al. |
| 6,014,643 | A | 1/2000 | Minton |
| 6,016,483 | A | 1/2000 | Rickard et al. |
| 6,035,288 | A | 3/2000 | Solomon |
| 6,076,068 | A | 6/2000 | DeLapa et al. |
| 6,247,000 | B1 | 6/2001 | Hawkins et al. |
| 6,317,727 | B1 | 11/2001 | May |
| 6,405,180 | B2 | 6/2002 | Tilfors et al. |
| 6,421,653 | B1 | 7/2002 | May |
| 6,560,580 | B1 | 5/2003 | Fraser et al. |
| 6,618,707 | B1 | 9/2003 | Gary |
| 7,246,093 | B1 | 7/2007 | Katz |
| 2002/0002530 | A1 | 1/2002 | May |
| 2002/0013760 | A1 | 1/2002 | Arora et al. |
| 2002/0019799 | A1 | 2/2002 | Ginsberg et al. |
| 2002/0052816 | A1 | 5/2002 | Clenaghan et al. |
| 2002/0082967 | A1 | 6/2002 | Kaminsky et al. |
| 2002/0138401 | A1 | 9/2002 | Allen et al. |
| 2002/0152152 | A1 | 10/2002 | Abdelnur et al. |
| 2002/0156716 | A1 | 10/2002 | Adatia |
| 2002/0198813 | A1 | 12/2002 | Patterson, Jr. et al. |
| 2003/0004858 | A1 | 1/2003 | Schmitz et al. |
| 2003/0018569 | A1 | 1/2003 | Eisenthal et al. |
| 2003/0097325 | A1 | 5/2003 | Friesen et al. |
| 2004/0215538 | A1 | 10/2004 | Smith et al. |
| 2005/0125326 | A1 | 6/2005 | Nangalia et al. |
| 2006/0106713 | A1 | 5/2006 | Tilly et al. |
| 2006/0149659 | A1 | 7/2006 | Carone et al. |
| 2006/0167788 | A1 | 7/2006 | Tilly et al. |
| 2006/0167789 | A1 | 7/2006 | Tilly et al. |

OTHER PUBLICATIONS

Wang, G. et al. "Information Transmission and Electronic Versus Open Outcry Trading Systems: An Intraday Analysis of E-Mini S&P 500 Futures, S&P 500 Index Futures and S&P 500 Cash Index", paper presented in Thailand on Dec. 3-4, 2001.

Tsang, R. "Open outcry and electronic trading in futures exchanges", Bank of Canada Review, Spring 1999, pp. 21-39.

Elind Computers Private LMTD, "Online Global Trading System for Marketplaces", brochure, no date.

C. Danis, et al. "Alternatives to an Open Outcry Market: An Issue of Supporting Cooperation in a Competitive Situation", IBM TJ Watson Research Center, USA.

Clemens et al., "Segmentation, differentiation, and flexible pricing: Experiences with information technology and segment-tailored strategies", *Journal of Management Information Systems: JMIS*, vol. 11, No. 2, pp. 9-36, Fall 1994.

"Squeezing the poor", *Guardian*, p. 8, Feb. 11, 1997.

"La libre competencia sacude a las electricas", *Actualidad Economica*, p. 18, Sep. 30, 1996.

Souter, Gavin, "Bermuda's reinsurers eager to please", *Business Insurance*, vol. 28, No. 44, p. 77, Oct. 31, 1994.

"The Electronic Component", The Options Institute Online Learning Center, obtained at the internet address: http://www.cboe.com/LearnCenter/cboeeducation/Course_02_02/mod_02_03.html.

"Self-Regulatory Organizations; Notice of Filing of Proposed Rule Change and Amendment No. 1 Thereto by the Pacific Exchange, Inc. Relating to the Exchange's New Trading Platform for Options, PCX Plus", 67 Fed. Reg. 69,580-69,592 (Nov. 18, 2002).

E. Clemons et al., "Information Technology and Screen-Based Securities Trading: Pricing the Stock and Pricing the Trade", *Management Science*, vol. 43, No. 12, Dec. 1997.

"The Pandora's Box over autoquotes; Industry Trend or Event", *Wall Street & Technology*, Section No. 3, vol. 13, p. 38; ISSN: 1060-989X, Mar. 1997.

"How is a Trade Executed—Limit Order", *Nasdaq*, dated Mar. 7, 2000, One Page.

S. Cosgrove, "Courting Retail, Institutional Customers, CBOE, AMEX Get Creative", *Knight-Ridder Financial News*, Jan. 29, 1993.

Self-Regulatory Organizations: Proposed Rule Change by the Cincinnati Stock Exchange Relating to Small Order Execution Guaranty, 1985 WL 547562; SEC Release No. 22330, Aug. 15, 1985.

A Monitoring Report on the Operation of the Cincinnati Stock Exchange National Securities Trading System, U.S. Securities and Exchanges Commission, May 1981.

A Report on the Operation of the Cincinnati Stock Exchange National Securities Trading System 1978-1981, U.S. Securities and Exchange Commission, Sep. 1982.

CBOT Press Release Entitled "Impressive Project A® Provides Extended Opportunity in CBOT Financial Complex", dated Jan. 1995, printed from the Internet at http://web.archive.org/web/19990429192354/finance/wat.ch/SCFOA/bulletin/_0001960.htm on Oct. 31, 2005, 3 pages.

A. Frino et al., Price and Time-Priority Versus Pro-Rata Algorithms in Electronically Traded Futures Markets: Simulation Based Performance Characteristics, Oct. 3, 1998, http://www.sirca.org.au/research/database.html (Document 1998009.pdf).

A. Frino et al., The Liquidity of Automated Exchanges: New Evidence From Germany Bund Futures, vol. 8, Journal of International Financial Markets, Institutions and Money, pp. 225-241 (1998).

Self-Regulatory Organization; Chicago Stock Exchange, Inc.; Order Approving Proposed Rule Change Creating the Chicago Match System (59 F.R. 63141) SEC Release No. 34-35030, 1994 SEC LEXIS 3863, Nov. 30, 1994.

A. Sarker et al., "Electronic Trading on Futures Exchanges," Current Issues in Economics and Finance, Federal Reserve Bank of New York, vol. 4, No. 1, Jan. 1998.

Self-Regulatory Organization; Order Approving Proposed Rule Change and Notice of Filing in Order Granting Accelerated Approval of Amendment No. 2 to the Proposed Rule Change by the Philadelphia Stock Exchange, Inc. Relating to Enhanced Specialist Participation in Parity Options Trades, SEC Release No. 34-35429, 60 F.R. 12802, Mar. 8, 1995.

CBOE Rules, CCH (1989) (Rules 6.45-8.80).

CBOE Information Circular IC 93-88 (Nov. 18, 1993).

U.S. Congress, Office of Technology Assessment, "Electronic Bulls and Bears: U.S. Securities Markets and Information Technology", OTA-CIT-469 (Washington, DC: U.S. Government Printing Office, Sep. 1990). (selected excerpts).

Self-Regulatory Organizations; Filing and Order Gracting Accelerated Approval of Proposed Rule Change by the Chicago Board Options Exchange, Inc., Relating to System Modifications to the Retail Automated Execution System, SEC Release No. 34-32879, 58 F.R. 49342, Sep. 22, 1993.

CBOE Regulatory Circular RG 91-71, Dec. 25, 1991.

Notice of Receipt of Plan Filed Pursuant to Section 11A(a)(3)(B) of the Securities Exchange Act of 1934, 1980 WL 29398, SEC Release No. 16519, Jan. 22, 1980.

New York Stock Exchange Constitution and Rules (Commerce Clearing House, Inc. New York Stock Exchange Guide) Jul. 15, 1965, pp. 2644-2645; 2682-83.

R. Teweles et al., The Stock Market, Fifth Edition, John Wiley & Sons, 1987, pp. 176-181.

J. Meeker, The Work of the Stock Exchange, The Ronald Press Company 1923, pp. 108-109.

CBOE Information Circular IC91-15, Feb. 25, 1991.

Domowitz, Ian, "A taxonomy of automated trade execution", Journal of International Money and Finance (1993), 12, 607-631.

SEC Notice, Release No. 34-37959, SR-CBOE-2002-05, Federal Register vol. 68, No. 110, dated Monday, Jun. 9, 2003, pp. 34441-34448.

Original Rule Filing and Amendment No. 1 to SR-CBOE-2002-05, Submitted to SEC on Jan. 16, 2002, 36 pages.

Amendment No. 2 to SR-CBOE-2002-05, Submitted to SEC on May 16, 2002, 21 pages.

Amendment No. 3 to SR-CBOE-2002-05, Submitted to SEC on Jan. 15, 2003, 69 pages.

Amendment No. 4 to SR-CBOE-2002-05, Submitted to SEC on Apr. 3, 2003, 71 pages.

Amendment No. 5 to SR-CBOE-2002-05, Submitted to SEC on May 15, 2003, 3 pages.

Amendment No. 6 to SR-CBOE-2002-05, Submitted to SEC on May 30, 2003, 8 pages.

SEC Notice, Release No. 34-39086, SR-PCX-97-18, Federal Register vol. 62, No. 185, dated Wednesday, Sep. 24, 1997, pp. 50036-50048.

Angel, James J., "How Best to Supply Liquidity to a Small-Capitalization Securities Market", Georgetown University, Jul. 15, 1996, 27 pages.

Co-Pending U.S. Appl. No. 60/986,727, filed Nov. 9, 2007.

SEC Notice, Release No. 34-46803, SR-PCX-2002-36, Federal Register vol. 67 No. 222, dated Monday, Nov. 18, 2002, pp. 69580-69592.

HYBRID TRADING SYSTEM FOR CONCURRENTLY TRADING COMBINED ORDERS FOR FINANCIAL INSTRUMENTS THROUGH BOTH ELECTRONIC AND OPEN-OUTCRY TRADING MECHANISMS

CROSS-REFERENCE TO RELATED APPLICATIONS

This application claims the benefit of U.S. Application No. 60/904,542, filed Mar. 2, 2007, pending, the entirety of which is incorporated herein by reference.

TECHNICAL FIELD

The present disclosure relates to the trading of securities and derivatives, such as underlying securities and options or futures based thereon.

BACKGROUND

The introduction of electronic trading mechanisms into exchanges for securities and derivatives has been steady and relentless. The desire for immediacy of order execution and dissemination of information is one reason for the steady switch to electronic mechanisms. The simple fact that trading volume is growing, with the accompanying need for an increasingly efficient trading environment, also favors the move toward electronic trading mechanisms.

Electronic exchanges, while efficient and immediate, do not necessarily supply the liquidity available in traditional, open outcry trading environments. One reason for this is the very efficiency that electronic mechanisms bring to an exchange. The speed with which trading takes place can adversely affect market makers by exposing them to unwanted risk. For example, if movement in the underlying security needs to be reflected in the options market, rapid response times are necessary. Communication delays can prevent market makers and others from changing their quotes or orders fast enough to reflect market conditions, thereby leading to smaller quote sizes to reduce the risk. Also, electronic exchanges generally cannot match the price improvement capabilities of an open outcry exchange where floor brokers and market makers can handle large and complex orders face-to-face.

Accordingly, there is a need for an exchange system and method that can address the drawbacks of electronic exchanges.

BRIEF SUMMARY

In order to address the need for improvements on electronic trading mechanisms, a trading platform is disclosed herein that provides efficient and substantially instantaneous electronic executions at the national best bid or offer (NBBO) along with the opportunity for price improvement for options and futures, as well as for trading the underlying securities upon which the options and futures are based.

According to a first aspect, a method of trading combined orders for the purchase or sale of securities and derivatives in an exchange configured for trading securities and derivatives by a combination of electronic and open-outcry trading mechanisms is disclosed. The method includes receiving an incoming order having a first order component and a second order component at an interface in communication with an electronic trade engine. The method includes routing the first order component to a first electronic database in the electronic trade engine and routing the second order component to a second electronic database in the electronic trade engine. Furthermore the method includes matching and executing the first order component against an order component maintained in the first electronic database according to matching rules accessed by the electronic trade engine, matching and executing the second order component against an order component maintained in the second electronic database according to the matching rules accessed by the electronic trade engine, and placing any unexecuted first and second order components in an electronic book if the first or second order component cannot be completely matched against any order components maintained in one of the first or second electronic databases.

In another aspect, an automated exchange system for the purchase or sale of securities and derivatives in an exchange configured for trading securities and derivatives is disclosed. The system includes an interface configured for receiving incoming orders having a first order component and a second order component generated by a market participant physically present at a floor of an exchange or a market participant at a location remote to the floor of the exchange and an electronic trade engine in communication with the interface. The electronic trade engine includes an electronic book configured for storing the first and second order components of the incoming orders received by the electronic trade engine in respective first and second databases, a database comprising at least one allocation algorithm, the database in communication with the electronic trade engine, and a trade processor in communication with the database for analyzing and executing orders according to the allocation algorithm selected from the database.

In yet another aspect, a computer readable medium is described that has processor executable instructions for trading combined orders for the purchase or sale of securities and derivatives by a combination of electronic and open-outcry mechanisms. The instructions are configured to direct a processor to receive an incoming order having a first order component and a second order component at an interface in communication with an electronic trade engine, route the first order component to a first electronic database in the electronic trade engine, and route the second order component to a second electronic database in the electronic trade engine. The instructions contained in the computer readable medium are further configured to cause a processor to match and execute the first order component against an order component maintained in the first electronic database according to matching rules accessed by the electronic trade engine, match and execute the second order component against an order component maintained in the second electronic database according to the matching rules, and place any unexecuted first and second order components in an electronic book according to a predetermined program if the first or second order component cannot be completely matched against any order components maintained in one of the first or second electronic databases.

DETAILED DESCRIPTION

A system and method for trading combined orders for securities, such as options and an underlying security upon which the option is based, is described herein. The trading mechanisms and rules described are based on providing incentives or limitations to particular classes of individuals or entities who are involved in trading at an exchange. For purposes of this specification, the following definitions will be used:

Broker/dealer=person or entity registered to trade for itself and/or on behalf of others at the exchange.

Public customer=person or entity, who is not a broker/dealer, trading on their own behalf through a broker/dealer or firm registered to trade at the exchange.

Firm=entity employing persons who represent the firm, or the firm's customers, on the exchange, such as market makers, floor brokers, broker/dealers, or other industry professionals.

Market maker=professional trader registered to trade at the exchange who is required to provide liquidity to a market, for example through streaming quotes for both a bid and an offer at a particular price.

Remote market maker (RMM)=market maker approved by the exchange to make transactions as a dealer-specialist from a location other than the physical trading station for the subject class of option (i.e., from off the floor of the exchange).

Designated primary market maker (DPM)=market maker designated by the exchange to be responsible for a fair and orderly market, and to provide continuous quotes, for a particular class of options.

Floor broker=individual who represents orders from others in a trading crowd on the floor of an exchange.

Market participant=any person or entity that can submit orders or quotes to an exchange.

In-crowd market participant (ICM)=floor broker, market maker or designated primary market maker physically present on the floor of the exchange.

Non-in-crowd market participant (non-ICM)=market participants who are not physically present on the floor of the exchange.

Class of options=all series of options related to a given underlying security, where the underlying security may be, for example, publicly traded stock of a company.

Figure 1:
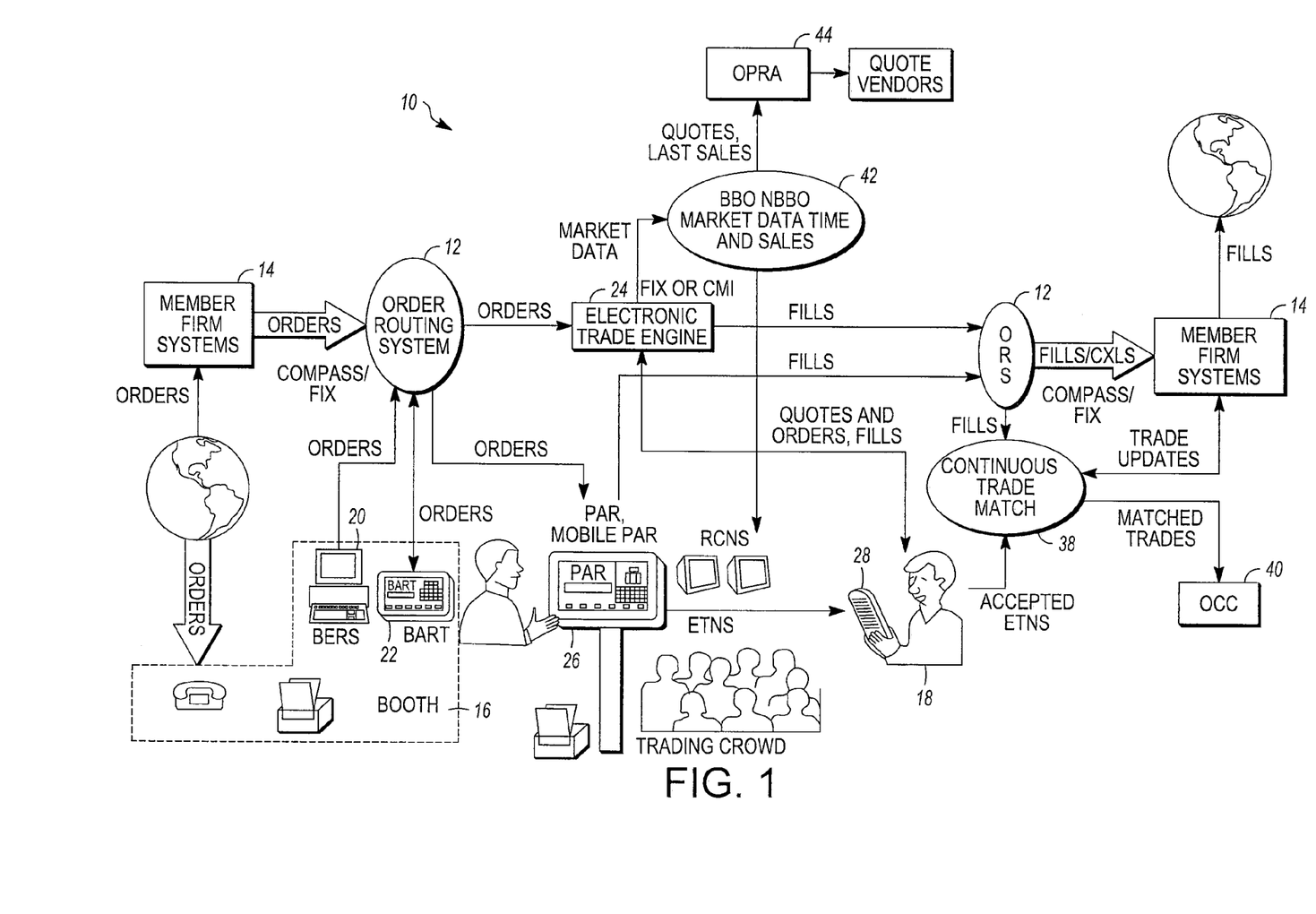
FIG. 1 is a diagram of a hybrid exchange system merging screen-based electronic orders with traditional open-outcry floor trading.

FIG. 1 illustrates one embodiment of a system suitable for implementing the hybrid exchange system combining aspects of electronic, screen-based trading with traditional, open-outcry trading and implement various securities and derivatives trading methods described herein. The system 10 receives combined orders for the purchase or sale of securities, for example orders for derivatives such as stock options combined with orders for the underlying stock (i.e., a "combined order"), from numerous sources at a central order routing system (ORS) 12. ORS 12 may be any of a number of data processing systems or platforms capable of managing multiple transactions. In one embodiment, the ORS 12 can be implemented on a transaction processing facility (TPF) platform manufactured by IBM Corporation. For purposes of clarity, the examples herein will refer specifically to combined orders for options coupled with orders for the underlying security for that option. It should be understood that the system and methods disclosed herein may be applied to the trading of other types of securities and derivatives. An exchange utilizing the system and methods described herein may manage a number of classes of derivatives, where each of the plurality of classes of derivatives are associated with an underlying asset such as a stock, a bond, a note, a future, an exchange traded fund, an index, a commodity or other known asset types.

Combined orders may be entered into the ORS 12 from remote member firm systems 14, from member firm's booths 16 physically located at the exchange system 10, from market makers 18 present on the trading floor of the exchange and from RMMs 19 located off of the floor of the exchange. The member firm systems 14 may be located remotely from the geographical location of the exchange and use any of a number of standard land-line or wireless communication networks to direct combined orders electronically to the ORS 12. The member firm systems 14 communicate with one of several interfaces or protocols for transmitting their combined orders to the ORS 12. Examples of suitable interfaces are those using a distributed object interface based on the CORBA standard and available from the Object Management Group. Interfaces such as financial information exchange (FIX), which is a message-based protocol implemented over TCP/IP available from FIX Protocol, Ltd., or other known securities transaction communication protocols are also suitable protocols. In some instances, combined orders may even be made by telephone calls or facsimile transmissions directly to the booths 16 of member firms at the exchange. Combined orders submitted from a booth 16 at the exchange may come from a booth entry and routing system (BERS) 20 or a booth automated routing terminal (BART) 22.

The BERS 20 is a computer workstation that provides firm staff members at the booth with an entry template and a graphic user interface with a number of function buttons arranged on the display. Combined orders entered at the booth through BERS 20 typically consist of orders that were telephoned to the booth and orders that were wired to member firm-owned house printers in the booth. The combined orders entered through BERS are entered manually by booth staff using an order template and graphic user interface on the workstation. Generally, a combined order entered at BERS 20 will be routed to the ORS 12. Member firms, however, may specify that a particular combined order entered through BERS be routed to the BART 22 device. The BART 22 device, sometimes referred to as the "electronic runner," allows member firms to maintain more control over their order flow. BART 22 allows each firm to customize certain ORS 12 parameters to route a certain portion of their order flow to the firm booth. For example, firms may instruct ORS 12 to send certain combined orders directly to their booths 16 based on the size of the order.

As with the BERS 20, BART 22 may be implemented on a touch-screen workstation located in the member firm booth. The BART 22 operator at the booth may electronically forward combined orders to desired destinations. Potential destinations for these booth-routed combined orders are the ORS 12, the electronic trade engine 24 in communication with the ORS 12, or the public automated routing (PAR) system 26 used by the floor brokers at the exchange. The PAR system 26 may be implemented as a PC-based, touch-screen order routing and execution system accessible by floor brokers on the floor of the exchange. The PAR system 26 terminals allow a floor broker to select an order from the workstation and receive an electronic trading card on which the floor broker may enter trade information such as its volume, price, opposing market makers, etc. When a floor broker completes a card, the floor broker can then execute a trade electronically with the touch of a finger on the touch screen interface. The PAR system 26 then transmits the completed order, also referred to as a "fill," back to the ORS 12. The PAR 26 may be a fixed workstation or a mobile workstation in the form of a handheld unit.

Market participants, such as market makers 18, on the floor of the exchange may enter quotes and orders via electronic devices, such as hand-held market maker terminals (MMT) 28. The MMT may be any of a number of electronic handheld devices capable of communicating with the electronic trade engine 24 and ORS 12 through an application programming interface (API) such as FIX version 4.2 or CMi, an API available from Chicago Board Options Exchange, Incorporated of Chicago, Ill. An example of a suitable handheld device is the Fujitsu Stylistic 3500 available from Fujitsu Ltd. of Tokyo, Japan. Market makers located away from the floor of the exchange, such as eDPMs and RMMs, the eDPMs and RMMs may communicate with the electronic trade engine 24 and ORS 12 through remote terminals utilizing these same or similar types of APIs.

Figure 2:
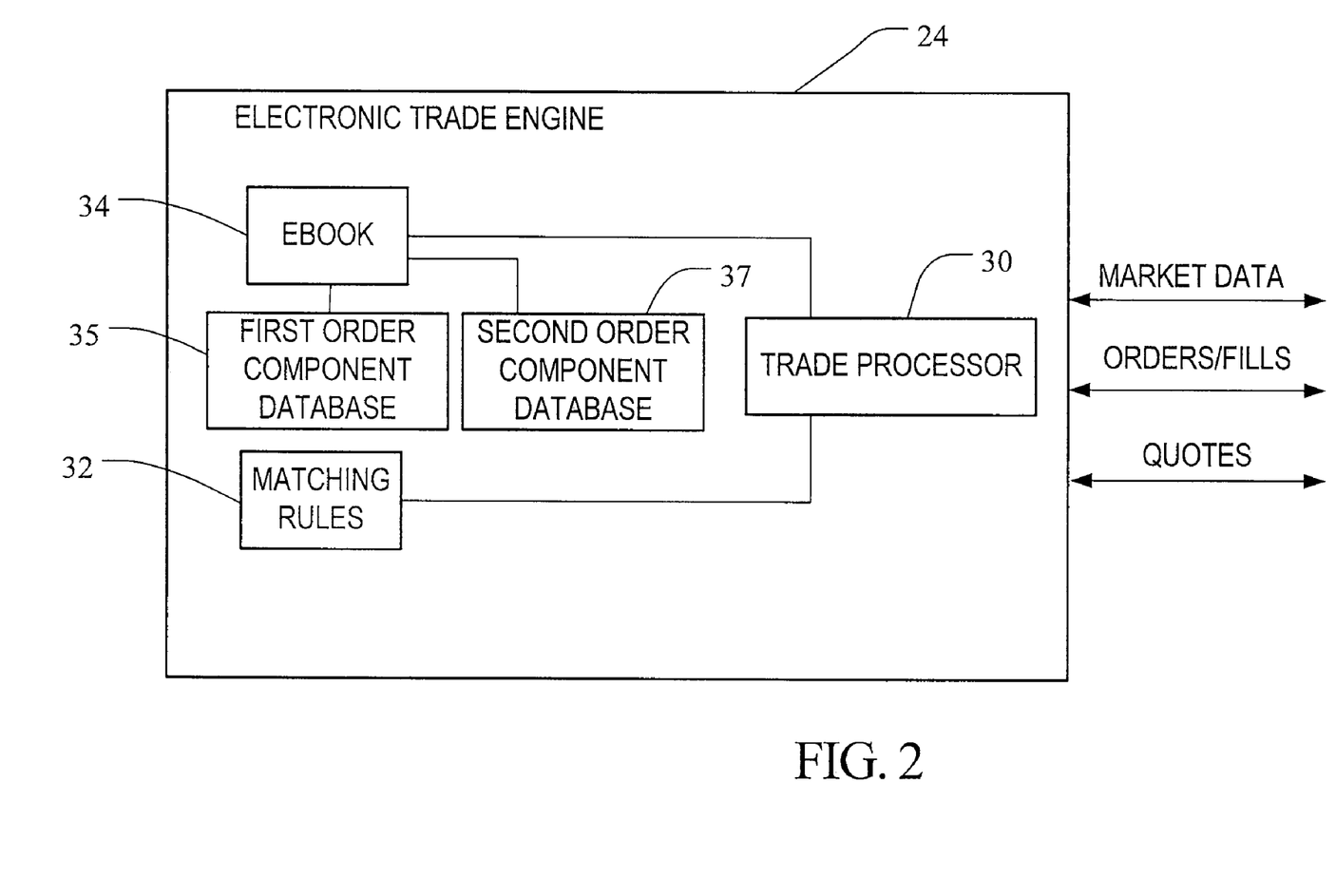
FIG. 2 is a block diagram of the electronic trading engine of FIG. 1.

As illustrated in FIG. 2, the electronic trade engine 24 contains a trade processor 30 that analyzes and manipulates combined orders according to matching rules 32 stored in a database in communication with the trade processor. Also included in the electronic trade engine is the electronic book (EBOOK) 34 of orders and quotes with which incoming combined orders to buy or sell are matched with quotes and orders resting on the EBOOK 34 according to the matching rules 32.

Further included in the EBOOK 34 of the electronic trade engine 24 are a first order component database 35 and a second order component database 37, for respectively storing first and second order components of a combined order. Each incoming combined order includes a first order component (such as an option order) and a second order component (such as a stock order for the underlying security of the option subject to the option order of the first order component). Upon receiving the incoming combined order, the electronic trade engine 24 separates the first order component from the second order component and routes the first order component to the first order component database 35. Additionally, the electronic trade engine 24 also routes the second order component to the second order component database 37.

The trade processor 30, utilizing matching rules 32, matches and executes the first order component against a like order or order component maintained in the first order component database 35. Likewise, the trade processor 30, again utilizing matching rules 32, matches and executes the second order component against a like order or order component maintained in the second order component database 37. The first and second order component databases, in addition to maintaining first and second order components, respectively, can also maintain uncombined orders for either options or stocks. In this way, combined orders that can be separated into first and second order components that may trade against option and/or stock orders that are submitted in a traditional, uncombined fashion and stored along with a corresponding first or second order component. Any remaining unexecuted first and/or second order components are placed in the electronic book 34 according to a predefined program.

The electronic trade engine 24 may be a stand-alone or distributed computer system. Any of a number of hardware and software combinations configured to execute the trading methods described below may be used for the electronic trade engine 24. In one embodiment, the electronic trade engine 24 may be a server cluster consisting of servers available from Sun Microsystems, Inc., Fujitsu Ltd. or other known computer equipment manufacturers. The EBOOK 34 portion of the electronic trade engine 24 may be implemented with Oracle database software and may reside on one or more of the servers comprising the electronic trade engine 24. The rules database 32 may be C++ or java-based programming accessible by, or executable by, the trade processor 30.

When a trade is completed, whether on the floor in open outcry and entered into PAR 26 or automatically executed through the electronic trade engine 24, the fill information is sent through the electronic trade engine 24 and ORS 12. ORS 12 passes the fill information to the member firm systems and to a continuous trade match (CTM) system 38 which matches the buy side and sell side of a trade which, in turn, forwards the matched trades to the Options Clearing Corporation (OCC) 40, a third party organization that will verify that all trades properly clear. The electronic trade engine 24 also sends quote and sale update information through an internal distribution system 42 that will refresh display screens within the exchange 10 and format the information for submission to a quote dissemination service such as the Options Price Reporting Authority (OPRA) 44.

Utilizing the system described above, a hybrid trading system retaining the benefits of traditional floor-based open-outcry exchanges and incorporating the efficiency of traditional electronic trading systems may be implemented. One way of maintaining the availability, and associated liquidity, of open-outcry floor trading is to provide incentives to certain market makers who have a physical presence on the trading floor of the exchange, or entities that have a representative physically present on the trading floor of the exchange. Market makers are specific exchange members making bids and offers for their own account in absence of public buy or sell orders in order to spur the market and provide liquidity. In one embodiment, the electronic trade engine 24 receives all quotes and identifies the source of the quote before allowing the quote to trade with, or be placed on, the EBOOK 34. This filtering is preferably accomplished by verifying specific market maker identification information embedded with quote information, for example through appending a unique acronym associated with the market maker to an order, or by only accepting quotes from market maker terminals identifiable as on the premises of the exchange. In one implementation, each market maker is logged into the exchange such that every communication from the market maker to the exchange will be identified based on the login information associated with that market maker.

Incoming electronic combined orders (other than sweep orders) have second order components (e.g., the stock order) that may be categorized as either marketable or non-marketable. For marketable second order components on exchange system 10 that are at the NBBO (National Best Bid and Offer), the second order component is automatically executed up to the disseminated size. Any remainder of the second order component is treated as if the exchange system 10 is not at the NBBO. Thus, for marketable second order components on the exchange system 10 that are not at the NBBO, the second order component is shown for a period of time, such as X milliseconds, to API users to permit such users to "step up" to the NBBO. If no users step up to the NBBO, the second order component will automatically be routed to an away exchange system (not illustrated) showing the NBBO, as is known in the art. Should the second order component remain non-marketable, the second order component will automatically book in the second order component database 37.

Second order components that are also Intermarket Sweep Orders (ISOs) will automatically execute at the exchange system 10, regardless of whether the exchange system 10 is at the NBBO. For such orders, any remaining portion will be cancelled.

In some instances, market maker quotes may cross during trading. A crossed quote occurs when the bid of a one market maker's quote is higher than an offer of another market maker's quote. Accordingly, several novel cross order types have been created to support open outcry trading of combined orders having first and second order components, or, more generally, open outcry trading and options tied to stock:

Paired Cross-Only Orders: When a trade is negotiated that is between the Best Bid or Offer (BBO) of the exchange system 10 and at or between the NBBO, a paired cross-only order can be used. Users will submit a paired order through the API. The pair will route together to the trade engine and, if they are for the same price and size they will trade against each other immediately as long as the price is at or within the quote on the exchange system 10 and the NBBO. If the trade price is equal to the exchange system 10 best market and the market includes public customer orders, the cross order must be: X shares or more; be for a dollar amount greater than or equal to $Y; and larger than any single public customer order at that price, where X and Y represent exchange configurable parameters.

Separate Cross-Only Order: When a trade is negotiated that is between the BBO of the exchange system 10 and at or between the NBBO, a separate cross-only order can also be used. Users will submit two separate orders with indications that they are for crossing only. The orders would have to arrive at the electronic trade engine 24 within a short time period, for example within X milliseconds of each other, where X is an exchange configurable parameter. If the second order does not arrive within X milliseconds, the first order will be cancelled. Once received, the handling process will be the same as for the paired orders Paired or Separate Sweep and Cross Order: Users will submit orders that are either paired or separate as described above that will trade against each other only after all interest in the book and at the top of the away markets is satisfied. The mechanics for executing this type of order are:
  i. The parties to the trade will determine the final price at which the trade will occur.
  ii. The contra-order will be sent to exchange system 10 through the contra-party's order entry mechanism and held in electronic trade engine 24.
  iii. The agency order will be sent to the exchange system 10, tagged to the contra order. The electronic trade engine 24 will automatically clear out the away markets and the EBOOK 34 so that the entire order is executed.

By way of example, assume that the DPM gets a phone call to buy 50,000 shares of stock ABC and the DPM and the customer negotiate a price of 20.05. The exchange system 10 market is 19.95-20.00 1000×1000. There are no orders on the EBOOK 34 between 20.00 and 20.05. If there were orders on the EBOOK 34 between 20.00 and 20.05, those orders would be traded in full before any remainder traded against the contra order. The away markets are:
  NYSE: 19.95-20.00 1000×1000
  NSX: 19.95-20.01 1000×1000
  BSE: 19.97-20.02 1000×1000
  CHX: 19.95-20.00 1000×1000

The DPM will enter a sell order for 50,000 shares at 20.05. The order will route to the electronic trade engine 24. Simultaneously, the customer's agent will enter a buy order for 50,000 shares and send it to the exchange system 10 (CBSX, below) through the API; the system 10 will automatically trade 46,000 shares and route four 1,000-share orders to the away exchanges. The agent that entered the customer order will receive all of the fills as follows:
  3000 at 20.00 (CBSX, NYSE, CHX)
  1000 at 20.01 (NSX)
  1000 at 20.02 (BSE)
  45,000 at 20.05 (CBSX)

The electronic trade engine 24 will automatically cancel the remainder of the contra order (5,000 shares). In the above example, if another user entered a sell order at 20.05, the tagged seller would receive a participation right, even if the tagged order were received after the order from the other user. Any reserve order at the top of the EBOOK 34 or between 20.00 and 20.05 would also trade in full. Since no market participants can see the reserve order, it could cause a different outcome for the contra order than what was expected.

Additionally, other orders may be offered, including Reserve Orders, Middle-Market Cross Orders, Cross Only Orders, and Cross and Sweep Orders A Reserve Order is a limit order in which the order originator designates a portion of the order for display and dissemination (the "display amount") and designates a portion of the order in "reserve." A reserve portion is not displayed but is available for execution against incoming orders. Reserve Orders are last in priority (except that most contingency orders are behind Reserve Orders in priority). Between Reserve Orders at the same price, priority is afforded utilizing the matching algorithm in effect for the stock. If, after an execution against a Reserve Order, a quantity remains on the Reserve Order, the quote will be refreshed to disseminate the display amount while any remaining balance will be retained in reserve.

A Middle Market Cross Order is an order submitted to trade at the midpoint of the NBBO. It must always be submitted with a contra order for the same size and may only be entered when the bid price for the stock is $1 or greater. Further, these orders could be executed in increments as small as ½ the minimum quoting increment. If a Middle Market Cross is submitted after the exchange is open but before other markets are open (e.g. 8:20 am Chicago time) the order will execute at the midpoint of best bid and offer among market centers that are open and disseminating quotes (or just the exchange midpoint if the exchange is the only market center that is open). A member would be prohibited from entering Middle Market Cross-Orders as principal buyer (seller) if the NBBO spread is one cent wide and that member was an agent for any customer orders resting at the prevailing NBBO bid (offer). This provision is meant to preclude a member from trading as principal at a price that is less than one cent better than a price expressed by a customer of that member to which the members has a fiduciary obligation.

A Cross Only Order is an order that may only be executed against another Cross Only Order for the same size and price. These orders may only be entered at or between the NBBO, and when entered at the exchange BBO, only when the terms of the orders meet the crossing parameters set forth relating to priority for crosses at the exchange's disseminated market price.

A Cross and Sweep Order is an order that is priced outside of the NBBO and/or the BBO where the applicable side of the book is satisfied by the Cross and Sweep Order and any disseminated better priced protected quotations at away market centers are swept with ISOs by the exchange system. Any remaining balance on a partially executed Cross and Sweep Order would be cancelled by the exchange system.

The manner in which Stop Orders (including Stop Limit Orders) are handled may be modified in one implementation. By way of example, a stop buy (sell) order is elected when the stock trades or is bid (offered) at or above (below) the stop price. In an embodiment, the exchange would handle stop orders so that a stop buy (sell) order is elected only when the stock trades at or above (below) the stop price on the primary market for the stock.

Referring again to FIGS. 1 and 2, when a market maker 18 enters a quote (including at a handheld terminal 28), the quote is related to the electronic trade engine 24. The electronic trade engine 24 calculates the best bid or offer (BBO) from among all the quotes and orders entered and, if the quote is at the current BBO, the quote may be immediately matched against incoming orders subject to the various trade mechanisms described herein. If the new quote improves on the BBO, the new BBO is sent to the ORS 12 and is displayed on displays throughout the exchange. Alternatively, if the new quote matches the BBO, the new quote volume is added to the volume of the existing disseminated BBO. The ORS 12 also forwards the new BBO to the national quoting service known as OPRA, which then forwards this information to various quote vendors who subscribe to the OPRA service. If the new quote is not at, or better than, the current BBO, the quote is placed in the EBOOK 34.

When a combined order is received at the ORS 12, ORS 12 determines whether it qualifies for routing to the electronic trade engine 24. The ORS 12 examines both the order size and price. If the order price is at the market, it may be sent directly to the electronic trade engine for immediate execution. However, each order is also screened based on a two-tier order size analysis. First, the exchange may set a default auto-execution limit such that any amount of the order exceeding that size limit will be routed to the PAR system 26 for open-outcry trading on the floor of the exchange. Second, even if some or all of the order is within the exchange default size limit, each firm or broker may have a separate customized routing instruction that takes precedence over the exchange limit so that some or all of the order that would qualify for auto execution will be routed else where. For example, the firm or broker from whom the order originated may have previously instructed ORS 12 to have their orders routed first to their booth 16 for more detailed handling.

After passing through ORS 12, the trade processor 30 checks to see if the incoming combined order is immediately marketable against orders and quotes resting in the EBOOK 34. If the order price on the incoming order to buy or sell matches a counterpart offer to sell or buy on the EBOOK 34, then the order is considered marketable and the trade processor 30 looks at the matching rules database 32 to determine allocation of the incoming electronic order among the various counterpart quotes and orders on the EBOOK 34.

A number of priority overlays described herein may be implemented alone or in combination. One such priority overlay is price-time priority. In price-time priority, resting orders in the EBOOK 34 are prioritized according to price and time. If there are two or more orders at the best price, then priority is afforded among these orders in the sequence in which they were received by the exchange system 10. Other overlays may be implemented as a specific percentage of an order being reserved for the DPM prior to allocation among the remaining in-crowd market participants. When used in combination with overlays for public customer priority and market turner priority, the DPM priority may be taken after the execution of any booked public customer orders that can trade with the new order but before the market turner priority. In other embodiments, the DPM may be allowed the greater of the fixed percentage they would receive from the order under the DPM priority or the percentage of the order they would get under a matching algorithm, if the DPM quote was pooled with the remaining in-crowd market participants competing for a portion of the order. Any of the priority overlays described above may be used individually, in any combination, or turned off altogether.

The matching algorithm may include any of a number of criteria. In one embodiment of the matching algorithm, the electronic trade engine 24 allocates incoming orders to the multiple market participants according to price-time priority as described herein above. In this embodiment, no DPM allocation percentages are employed and no agency or customer priority is utilized. Additionally, price-time priority can apply for users responding to NBBO rejects.

Figure 3:
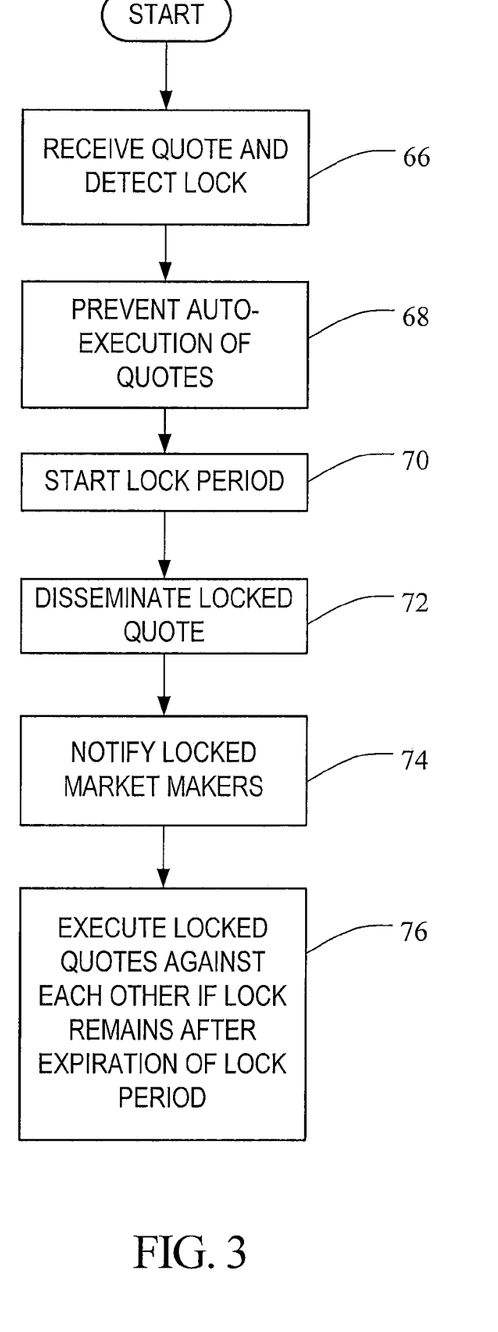
FIG. 3 illustrates a method of handling locked quotes in the hybrid exchange system of FIGS. 1 and 2

In the hybrid exchange environment described, where electronic, screen-based trading and manual, open-outcry pit trading are interconnected, the ability of multiple market makers on the floor to stream quotes for dissemination to the market on the same particular product may lead to quote interaction such as quote locking or crossing. A quote "locks" another quote when the bid price of an in-crowd market maker's quote matches the offer price of another in-crowd market maker's quote. As shown in FIG. 3, the locking of market maker quotes is detected by the electronic trade engine, which automatically invokes a quote interaction mechanism (at step 66). A delay timer is started and the electronic trade engine prevents the market makers with the locked quotes from trading with each other for a predetermined period set by the delay timer (at steps 68, 70). Although the locked market maker quotes will not automatically trade during the delay period, the locked quote is disseminated to the market and made available for execution against orders from any market participant order that can be routed to the electronic book either directly or through the PAR system (at step 72). After a notification delay, which is a time less than the overall delay timer for preventing the automatic trade, the electronic trade engine will notify each of the locked in-crowd market makers over their respective market maker terminals with a message that includes the identification of the other in-crowd market participants on the other side of the lock (at step 74). At this point, the locked in-crowd market makers can move their quotes away from locking with other in-crowd market makers or they can choose to leave their quotes alone.

After expiration of a complete lock period, which includes the initial notification period, any quotes still locked will automatically trade against each other (at step 76). In one embodiment, if more than one incoming quote locks an existing quote, the time period will not be restarted for the original locked parties each time a new incoming quote is entered. In other embodiments, a new delay timer specific to each new quote that locks against already locked quotes may be implemented to allow each new market maker the same period of time in which to revise their own quote as the initial locked pair.

Incoming quotes will be executed against resting quotes according to the matching algorithm described above and, if an incoming quote locks against more than one resting quote, that incoming quote will also be allocated among the resting quotes using the matching algorithm allocation described above. In one embodiment, the notification period, which is the period after locking within which a notification is sent to each of the locked quoting parties, is one second. The lock period, which is the total period in which the market maker quotes are kept from trading against each other, may be ten seconds. In other embodiments, these preset time periods may be adjusted to suit the specific needs of the exchange. Preferably, the lock period and notification period are monitored and applied at the electronic trade engine 24 based on the matching rule instructions 32 maintained in the electronic trade engine 24.

Numerous variations of market maker quotes locking or crossing, mixed with on-going receipt of orders from customers to execute against the bid or offer of the resulting locked quotes, may be handled according to the methods described above. In an embodiment, the notification and lock period used for locked quotes will be the same as those used for crossed quotes. The locked market notification message will be sent to in-crowd market participants in crossed quote situations and locked quote situations. In other embodiments, the quote locking and crossing procedures described above may be used in electronic-only exchanges where all other specific classes of market participants, such as all market makers, will invoke these procedures.

In another embodiment, an additional trading mechanism may be implemented to foster and encourage participation in trades by temporarily restraining execution of an in-crowd market participant quote that arrives at the electronic trade engine 24 that is marketable against a resting order on the EBOOK 34 that is not from an in-crowd market participant. The purpose of the temporary restraint on execution is to allow a preset grace period within which other in-crowd market participant quotes or orders maybe submitted at the best price represented by the new in-crowd market participant quote. Advantages of temporarily restraining this type of trade included encouraging more in-crowd market participants to quote at the best price and the removal of any communication or computer hardware advantage among the in-crowd market participants. In one embodiment, delaying execution of the resting order consists of delaying allocation of the resting order.

In order to provide a market and control the opening trades in the hybrid exchange 10 described above, a market opening procedure may be implemented that varies from the steady-state trading mechanisms described above. In the context of a hybrid exchange for securities options, opening takes place after the market for the underlying security is underway. Opening, in the securities option exchange, is considered to last for the period of time it takes to calculate an opening price. The electronic trade engine 24, utilizing start-up rules stored in its matching rules 32 database, will publish an expected opening price (EOP) and an expected opening size (EOS) to the market through the various APIs supported by the exchange. The EOP is updated as pre-market conditions change.

In one embodiment, the opening procedure starts when the opening trade for the underlying security (the second order component) is received. The electronic trade engine 24 will then start a timer and move into an opening rotation state. In the opening rotation state, the EOP and EOS are calculated based on size and prices of orders and quotes received prior to opening of the market and disseminated to DPMs and market makers. After the timer expires, the electronic trade engine 24 will look to see if a valid quote has been submitted by the DPM for each series of options. If valid quotes exist, the market will proceed to open. If a DPM has not entered a valid quote, the electronic trade engine 24 will not proceed to opening, thereby allowing a DPM to delay the opening process if necessary. When there is an imbalance between buy and sell orders at opening, a matching algorithm is applied. The matching algorithm may be as described above or it may be some other algorithm, for example a first in first out (FIFO) algorithm. In one embodiment, as with any of the algorithms and procedures described above, the exchange may control opening procedure algorithm choice by class or series and by day so that a variety of combinations of procedures may be implemented for a particular class or series of securities options on any given day. In one version of an opening procedure, quotes will immediately trade against quotes and no quote locking delay will be implemented.

As has been described above, the hybrid exchange system merges electronic and open outcry trading models while at the same time offering market participants the ability to trade combined orders for securities and options on those securities. The ability to receive combined orders and stream electronic quotes, coupled with the ability to separate the first and second order components of the electronic order (including matching and executing same) will reward market participants that quote at the best price and may have the attendant benefit of tightening the exchange's best disseminated quote.

The disclosed hybrid exchange system and method also retains the benefits inherent in a floor-based, open outcry exchange. Order entry firms will continue to have the ability to have their floor brokers walk into a trading crowd and request markets on-behalf of their customers. Trading crowds may continue to offer price discovery to orders of size, complex orders, and other orders that are exposed to the open outcry, auction market environment. Additionally, the hybrid exchange system and method enhance the automatic execution capabilities of broker/dealers. For example, non-market maker broker/dealers have the same access to the electronic execution features as public customers in designated classes. This allows eligible broker/dealers (e.g. non-ICM broker/dealers) to receive more automatic executions of the orders they route to the exchange.

Also, the disclosed hybrid exchange system and method "opens the book" to certain types of broker/dealer orders. In one implementation, broker/dealer orders are only permitted access to an autoexecution feature that allows for immediate electronic execution of orders routed to the exchange. For example, certain broker/dealer orders will be eligible for placement into the EBOOK 34 against which they may be executed electronically. Broker/dealers may also electronically access the EBOOK 34 (i.e., buy or sell the book) in eligible classes. This feature will allow for the automatic execution of broker/dealer orders against resting limit orders in the book, whether they are public customer or broker/dealer orders in the book.

Although the system and methods described herein preferably relate to a hybrid system incorporating and involving active participation from a trading floor and a screen-based electronic trading crowd, many of the procedures described may be applied to an exclusively electronic, screen-based exchange that does not include floor based, open-outcry trading. As will be appreciated by those of ordinary skill in the art, mechanisms for the priority overlays, quote crossing, quote locking, matching algorithm and other features described above may all be modified for application to electronic-only trading. For example, by altering several of the rules relating to which market participants may obtain the benefit of these procedures from in-crowd market participants to other combinations of market participants, such as eDPMs an improved electronic marketplace may also be achieved.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. It is therefore intended that the foregoing detailed description be regarded as illustrative rather than limiting, and that it be understood that it is the following claims, including all equivalents, that are intended to define the scope of this invention.

What is claimed is:

1. A method of trading combined orders for the purchase or sale of securities and derivatives in an exchange configured for trading securities and derivatives by a combination of electronic and open-outcry trading mechanisms comprising:
receiving an incoming order having a first order component and a second order component at an interface in communication with an electronic trade engine;
routing the first order component to a first electronic database in the electronic trade engine;
routing the second order component to a second electronic database in the electronic trade engine;
matching and executing the first order component against an order component maintained in the first electronic database according to matching rules accessed by the electronic trade engine;
matching and executing the second order component against an order component maintained in the second electronic database according to the matching rules accessed by the electronic trade engine; and
placing any unexecuted first and second order components in an electronic book according to a predetermined program if the first or second order component cannot be completely matched against any order components maintained in one of the first or second electronic databases.

2. The method according to claim 1, wherein the first order component is an options order.

3. The method according to claim 1, wherein the first order component is a futures order.

4. The method according to claim 1, wherein the second order component is a stock order.

5. The method according to claim 1, wherein the second order component is a futures order.

6. The method according to claim 1, wherein the first electronic database is maintained in an electronic book.

7. The method according to claim 1, wherein the second electronic database is maintained in an electronic book.

8. An automated exchange system for the purchase or sale of securities and derivatives in an exchange configured for trading securities and derivatives comprising:
an interface configured for receiving incoming orders having a first order component and a second order component generated by a market participant physically present at a floor of an exchange or a market participant at a location remote to the floor of the exchange; and
an electronic trade engine in communication with the interface comprising:
an electronic book configured for storing the first and second order components of the incoming orders received by the electronic trade engine in respective first and second databases;
a database comprising at least one allocation algorithm, the database in communication with the electronic trade engine; and
a trade processor in communication with the database for analyzing and executing orders according to the allocation algorithm selected from the database.

9. The automated exchange system according to claim 8, wherein the first order component is an options order.

10. The automated exchange system according to claim 8, wherein the first order component is a futures order.

11. The automated exchange system according to claim 8, wherein the second order component is a stock order.

12. The automated exchange system according to claim 8, wherein the second order component is a futures order.

13. The automated exchange system according to claim 8, wherein the at least one allocation algorithm is price-time priority.

14. The automated exchange system according to claim 8, the trade processor further comprising:
a first set of instructions for determining a total number of market makers at a matching price of the incoming electronic order; and
a second set of instructions for determining an order priority based on the total number of market makers at the matching price and a sequence in which the incoming electronic orders were received by the electronic trade engine.

15. A computer-readable storage medium having processor executable instructions for trading combined orders for the purchase or sale of securities and derivatives in an exchange configured for trading securities and derivatives by a combination of electronic and open-outcry trading mechanisms, the instructions configured to direct a processor to:
receive an incoming order having a first order component and a second order component at an interface in communication with an electronic trade engine;
route the first order component to a first electronic database in the electronic trade engine;
route the second order component to a second electronic database in the electronic trade engine;
match and execute the first order component against an order component maintained in the first electronic database according to matching rules accessed by the electronic trade engine;
match and execute the second order component against an order component maintained in the second electronic database according to the matching rules accessed by the electronic trade engine; and
place any unexecuted first and second order components in an electronic book according to a predetermined program if the first or second order component cannot be completely matched against any order components maintained in one of the first or second electronic databases.

* * * * *